US009004591B2

(12) United States Patent
Murasaki et al.

(10) Patent No.: US 9,004,591 B2
(45) Date of Patent: Apr. 14, 2015

(54) FIXTURE UNIT AND COVER FIXING METHOD

(75) Inventors: Ryuichi Murasaki, Tokyo (JP); Yuichi Masuda, Toyama (JP); Eiichi Sasada, Tokyo (JP)

(73) Assignee: YKK Corporation (JP)

( * ) Notice: Subject to any disclaimer, the term of this patent is extended or adjusted under 35 U.S.C. 154(b) by 103 days.

(21) Appl. No.: 13/812,209

(22) PCT Filed: Jul. 28, 2010

(86) PCT No.: PCT/JP2010/062714
§ 371 (c)(1),
(2), (4) Date: Jan. 25, 2013

(87) PCT Pub. No.: WO2012/014296
PCT Pub. Date: Feb. 2, 2012

(65) Prior Publication Data
US 2013/0119731 A1    May 16, 2013

(51) Int. Cl.
*A47C 31/02*      (2006.01)
*A44B 13/00*      (2006.01)
(Continued)

(52) U.S. Cl.
CPC ........... *A44B 13/0035* (2013.01); *Y10T 24/318* (2015.01); *B60N 2/5825* (2013.01); *A47C 31/11* (2013.01)

(58) Field of Classification Search
CPC .. B60N 2/5825; B60N 2/5816; B60N 2/5819; B60N 2/6018; A47C 31/11; A47C 31/023; A47C 31/026
USPC ................... 297/218.2, 218.4, 218.5, 228.11; 24/102 T
See application file for complete search history.

(56) References Cited

U.S. PATENT DOCUMENTS

| | | | | |
|---|---|---|---|---|
| 2,592,725 A | * | 4/1952 | Oram | 24/453 |
| 3,938,224 A | * | 2/1976 | Delahousse et al. | 24/102 T |
| 5,964,017 A | * | 10/1999 | Roberts | 29/91.1 |

(Continued)

FOREIGN PATENT DOCUMENTS

| | | |
|---|---|---|
| CN | 101049817 A | 10/2007 |
| CN | 101756554 A | 6/2010 |

(Continued)

OTHER PUBLICATIONS

International Search Report, PCT Application No. PCT/JP2010/062714, mailed Oct. 19, 2010.

(Continued)

*Primary Examiner* — Sarah B McPartlin
(74) *Attorney, Agent, or Firm* — Kilpatrick Townsend & Stockton LLP

(57) ABSTRACT

A fixing unit includes: an attachment member attached to a seat body; an engaging member engaged with an opening provided to the seat body; and a string member connecting the attachment member and the engaging member, the string member being engaged with a cover. The engaging member includes: a body to which the string member is attached; a first contact portion provided to the body to be in contact with a first periphery of the opening; and an insert portion provided on the body at a position spaced apart from the first contact portion, the insert portion being inserted into the opening. The insert portion includes a first restricting portion to be in contact with a second periphery of the opening opposite the first periphery to restrict the insert portion from being detached from the opening.

13 Claims, 10 Drawing Sheets

(51) Int. Cl.
*B60N 2/58* (2006.01)
*A47C 31/11* (2006.01)

(56) References Cited

U.S. PATENT DOCUMENTS

| | | | |
|---|---|---|---|
| 6,592,181 B2* | 7/2003 | Stiller et al. | 297/218.2 |
| 7,287,305 B2* | 10/2007 | Bednarski | 24/297 |
| 7,296,852 B2* | 11/2007 | Huse | 297/228.11 |
| 8,201,880 B2* | 6/2012 | Kato et al. | 297/180.12 |
| 2002/0108222 A1 | 8/2002 | Tillner | |
| 2003/0151280 A1 | 8/2003 | Hashiguchi | |
| 2007/0235990 A1 | 10/2007 | Yoshikawa et al. | |
| 2007/0235991 A1 | 10/2007 | Yoshikawa et al. | |
| 2007/0235992 A1 | 10/2007 | Yoshikawa et al. | |
| 2007/0235993 A1 | 10/2007 | Yoshikawa et al. | |
| 2009/0033131 A1* | 2/2009 | Clauser et al. | 297/218.4 |
| 2010/0148551 A1 | 6/2010 | Nguyen et al. | |

FOREIGN PATENT DOCUMENTS

| | | |
|---|---|---|
| EP | 1283125 | 2/2003 |
| JP | S61 86100 | 6/1986 |
| JP | 69107/1990 | 5/1990 |
| JP | 4999/1993 | 1/1993 |
| JP | 2001-300162 A | 10/2001 |
| JP | 2007-089869 A | 4/2007 |

OTHER PUBLICATIONS

Office Action, Chinese Patent Application No. 201080068307.5, mailed Sep. 26, 2014.

Supplementary European Search Report, Application No. 10 85 5306.6, Oct. 7, 2014.

* cited by examiner

FIXTURE UNIT AND COVER FIXING METHOD

This application is a national stage application of PCT/JP2010/062714 which is incorporated herein by reference.

TECHNICAL FIELD

The present invention relates to a fixing unit that fixes a cover to a seat body, a seat and a cover fixing method.

BACKGROUND ART

A seat conventionally used for a vehicle such as an automobile typically includes a cushion member of synthetic resin foam and the like and a cover that covers the cushion member. The cushion member used for a backrest of the seat is often three-dimensionally shaped, i.e. includes right and left portions projecting relative to a central portion thereof so as to be fitted to a body shape of a user. When the cushion member is covered with a cover of a shape corresponding to the three-dimensional shape of the cushion member, unless the cushion member and the cover are mutually closely contacted, the user feels less firmly held by the seat and less comfortable on the seat.

In view of the above, a fixing unit (suspension member) that fixes a cover while the cover is in close contact with a cushion member (body) has been known (see, for instance, Patent Literature 1).

The suspension member disclosed in Patent Literature 1 is used for attaching a cover of a backrest to a body of the backrest. The suspension member includes a first engagement portion that is engaged with a part (wire) of a frame portion of the body, a second engagement portion that is engaged with the other part of the frame, and a suspension member connecting the first and second engagement portions. The suspension member is integrally fixed on a backside of the cover via a fixed belt portion. The second engagement portion includes a plurality of holes into which a metal open ring is selectively attached.

During the use of the suspension member, after the first engagement portion is connected to the wire with a C ring and the suspension member is laid over beyond a lower part of the frame (second lower frame), the second engagement portion is pulled upward to hook the open ring of the second engagement portion to the frame (first lower frame), thus fixing the cover while the cover is closely contacted with the body.

CITATION LIST

Patent Literature

Patent Literature 1 JP-A-2001-300162

SUMMARY OF THE INVENTION

Problems to be Solved by the Invention

However, when the suspension member disclosed in Patent Literature 1 is used, in order to engage the open ring of the second engagement portion with the frame, the second engagement portion has to be pulled upward beyond an extent that allows the open ring to be engaged with the frame. Accordingly, a great pull-up force has to be applied to the suspension member, which causes some trouble in the process for attaching the suspension member to the frame.

Further, when the open ring is engaged with the frame, the second engagement portion is pulled backward from the pulled-up position. Thus, the tension applied to the frame and the cover by the suspension member is decreased and the cover is not stably attached to the body.

An object of the invention is to provide a fixing unit, a seat and a cover fixing method with which work efficiency can be enhanced and a cover can be stably attached to a seat body.

Means for Solving the Problems

A fixing unit according to an aspect of the invention is used for a seat including a seat body and a cover that covers the seat body, the fixing unit being used for fixing the cover to the seat body, the fixing unit including: an attachment member attached to the seat body; an engaging member engaged with an opening provided to the seat body; and a string member that connects the attachment member and the engaging member and is engaged with the cover, in which the engaging member includes: a body to which the string member is attached; a first contact portion provided to the body to be in contact with a first periphery of the opening; and an insert portion provided to the body being spaced apart from the first contact portion and to be inserted into the opening, and the insert portion is provided with a first restricting portion that is in contact with a second periphery of the opening opposite the first periphery to restrict the insert portion from being detached from the opening.

An attachment part (i.e. a part at which the attachment member is attached) of the seat body and an engagement part (i.e. a part at which the engaging member is engaged) of the seat body may be located on the same side of the seat body (e.g. backside) or may be located on mutually opposite sides (e.g. the front side and the backside). When the attachment part and the engagement part are located on the same side, the string member connecting the attachment member and the engaging member may preferably be laid over from the attachment part to the engagement part via a side opposite the side at which the attachment part and the engagement part are located. Thus, the tension for closely attaching to the seat body can be appropriately applied to the cover engaged with the string member.

According to the above aspect of the invention, when the seat body and the cover are fixed by the fixing unit, the attachment member is initially attached to the seat body and the string member and the cover are engaged. Subsequently, the string member is pulled to bring the first contact portion of the engaging member into contact with the first periphery of the opening in the applying direction of the tension applied on the string member (i.e. a direction opposite the pulling direction of the string member), thereby rotating the engaging member like a lever around the first contact portion (i.e. as a fulcrum of leverage) to insert the insert portion into the opening. At this time, the first restricting portion is in contact with a second periphery opposite the first periphery to restrict the insert portion from detaching from the opening, i.e. restrict the engaging member from detaching from the opening, thereby engaging the engaging member to the seat body.

According to the above aspect, the engaging member is rotated around the first contact portion to insert the insert portion into the opening, so that the engaging member can be easily engaged with the seat body.

Further, when the length of the string member is adjusted so that appropriate tension is applied to the string member while the insert portion is inserted into the opening, it is not necessary to pull up the engaging member more than necessary. Accordingly, the force of a worker required for inserting the insert portion into the opening can be reduced.

Thus, the engaging member can be easily engaged with the seat body and, consequently, the cover can be more easily fixed to the seat body.

Further, the insert portion is inserted into the opening and the engaging member is engaged with the seat body as a result of the rotation of the engaging member around the first contact portion. Accordingly, the engaging member is kept from moving in the above-described applying direction relative to the seat body during the engaging operation. With the above arrangement, the stress applied on the attachment member and the engaging member can be appropriately adjusted and maintained via the string member. Accordingly, the fixing unit can be stably fixed on the seat body and, consequently, the cover can be appropriately fixed to the seat body.

In the above aspect of the invention, it is preferable that the insert portion has elasticity, and the first restricting portion is located at a part at which the insert portion is in contact with the second periphery when the insert portion is elastically deformed before being inserted into the opening.

According to the above arrangement, since the insert portion is elastically deformed before being inserted into the opening, the insert operation of the insert portion can be easily performed. Further, the engaging member can be detached from the opening by elastically deforming the insert portion.

In addition, since the first restricting portion is located at the insert portion in contact with the second periphery, substantially simultaneously with the completion of the insertion operation of the insert portion into the opening, the insert portion can be restricted from being detached from the opening. Thus, the engaging member can be more easily engaged with the seat body.

In the above aspect of the invention, it is preferable that the insert portion includes: a first extension extending in an insertion direction in which the insert portion is inserted into the opening; a bent portion that is bent from an end of the first extension away from the first contact portion; and a second extension extending from the bent portion in a direction opposite the insertion direction, and the first restricting portion is provided at an end of the second extension in an extending direction of the second extension.

Accordingly, the insert portion is provided in a substantially U-shape having the first extension, the bent portion and the second extension. According to the above arrangement, by inserting the bent portion into the opening so that the bent portion initially enters the opening, the insert portion is more easily elastically deformed so that the ends of the first and second extensions opposite the bent portion come close with each other. Thus, the insert portion can be more easily inserted and, consequently, the engaging member can be more easily engaged with the seat body.

After the insert portion is inserted into the opening, the respective ends of the first and second extensions opposite the bent portion tend to extend in a direction mutually separating from each other. Thus, the first restricting portion provided on an end of the second extension becomes more likely to be in contact with the second periphery of the opening. Accordingly, the detachment of the insert portion can be securely prevented by the first restricting portion, so that the engaging member can be securely engaged with the seat body.

The fixing unit according to the above aspect of the invention preferably includes a second restricting portion located at a position corresponding to the second periphery, the second restricting portion being in contact with the seat body to restrict the insert portion from being sunk into the opening when the insert portion is inserted into the opening.

According to the above arrangement, the second restricting portion is in contact with the seat body when the insert portion is inserted into the opening, thereby restricting the insert portion from being sunk into the opening. Thus, the engaging member can be more easily engaged with the seat body and the engaging member can be securely engaged with the seat body.

In the above aspect of the invention, it is preferable that the seat body includes a plate body provided thereon with the opening, and the fixing unit includes a second contact portion extending from the first contact portion in a direction from the insert portion to the first contact portion, the second contact portion being inserted into the opening to be in contact with a side of the plate body opposite a side of the plate body at which the body is located.

According to the above arrangement, since the first contact portion is more easily in contact with the first periphery of the opening due to the presence of the second contact portion, the engaging member can be more easily rotated.

Further, since the detachment of the first contact portion from the opening is restricted by the contact of the second contact portion with the plate body when the insert portion is inserted into the opening, the detachment of the engaging member from the opening can be securely prevented in combination with the first restricting portion. Accordingly, the engaging member can be securely engaged with the seat body and the cover can be securely fixed to the seat body.

The fixing unit according the above aspect of the invention preferably includes a third contact portion extending from the first contact portion in a direction orthogonal to both the direction from the insert portion to the first contact portion and the insertion direction of the insert portion to the opening, the third contact portion being in contact with a part outside the opening seen in the insertion direction.

According to the above arrangement, the third contact portion is in contact with the outer part of the opening seen in the direction for the insert portion to be inserted into the opening, so that the first contact portion can be guided to the first periphery. Further, the first contact portion can be prevented from being sunk into the opening.

In addition, with the second contact portion being provided, when the engaging member is rotated around the first contact portion (i.e. when the insert portion is inserted into the opening), the portion near the first periphery of the opening can be held by second and third contact portions. Accordingly, the engaging member can be stably attached to the seat body.

Alternatively, the fixing unit according the above aspect of the invention preferably includes a fourth contact portion extending from the first contact portion in the direction from the insert portion to the first contact portion, the fourth contact portion being in contact with a part outside the opening seen in the insertion direction of the insert portion into the opening.

According to the above arrangement, the fourth contact portion is in contact with the outer part of the opening seen in the direction for the insert portion to be inserted into the opening, so that the first contact portion can be kept from being sunk into the opening.

Further, since the fourth contact portion extends in a direction from the insert portion to the first contact portion, the dimension of the fixing unit in a direction orthogonal to both the direction from the insert portion to the first contact portion and the direction for the insert portion to be inserted into the opening can be reduced as compared with the fixing unit provided with the above-described third contact portion.

A seat according to another aspect of the invention includes: a seat body; a cover covering the seat body; and the fixing unit according to the above aspect of the invention.

According to the above aspect of the invention, since the seat includes the above-described fixing unit as well as the seat body and the cover, the same advantages as the above-described fixing unit can be obtained.

In the set according to the above aspect of the invention, it is preferable that the seat body includes an opening in which the engaging member is engaged, and the opening is divided by a dividing portion into: a first opening of which a periphery is in contact with the first contact portion; and a second opening into which the insert portion is inserted.

According to the above arrangement, when the engaging member is rotated around the first contact portion that is in contact with the periphery of the first opening and the insert portion is inserted into the second opening, the dividing portion keeps the engaging member from being sunk into the openings. Thus, the engaging member can be appropriately engaged with the seat body.

A cover fixing method according to still another aspect of the invention is used for a seat including a seat body and a cover that covers the seat body, the cover fixing method being used for fixing the cover to the seat body, the method including: attaching an attachment member of a fixing unit to the seat body and engaging the cover with a string member connected to the attachment member; and engaging an engaging member to an opening provided to the seat body, the engaging member being provided on a side opposite the attachment member with the string member being interposed therebetween, in which, in the engaging, a contact portion provided on the engaging member is brought into contact with a first periphery of the opening located in an applying direction of tension applied on the string member, the engaging member is rotated around the contact portion to insert an insert portion provided in a direction opposite the applying direction relative to the contact portion into the opening, and a part of the insert portion is brought into contact with a second periphery of the opening opposite the first periphery to restrict the insert portion from being detached from the opening.

According to the above aspect of the invention, since the cover is fixed to the seat body with the use of the above-described fixing unit according to the above-described process and steps, the same advantages as the above-described fixing unit can be obtained.

DESCRIPTION OF EMBODIMENT(S)

First Exemplary Embodiment

A first exemplary embodiment of the invention will be described below with reference to the attached drawings.

Figure 1:
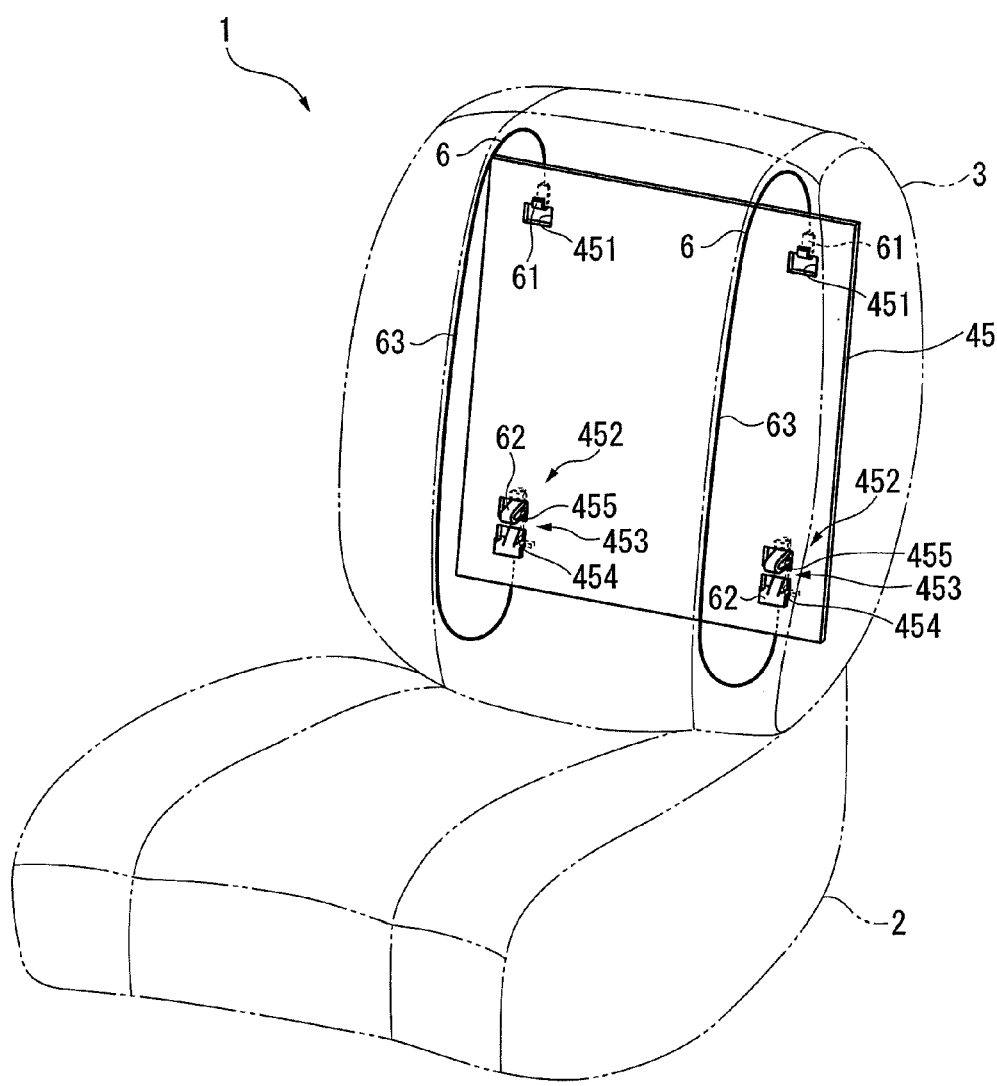
FIG. 1 is a perspective view showing a seat according to a first exemplary embodiment of the invention.
Figure 2:
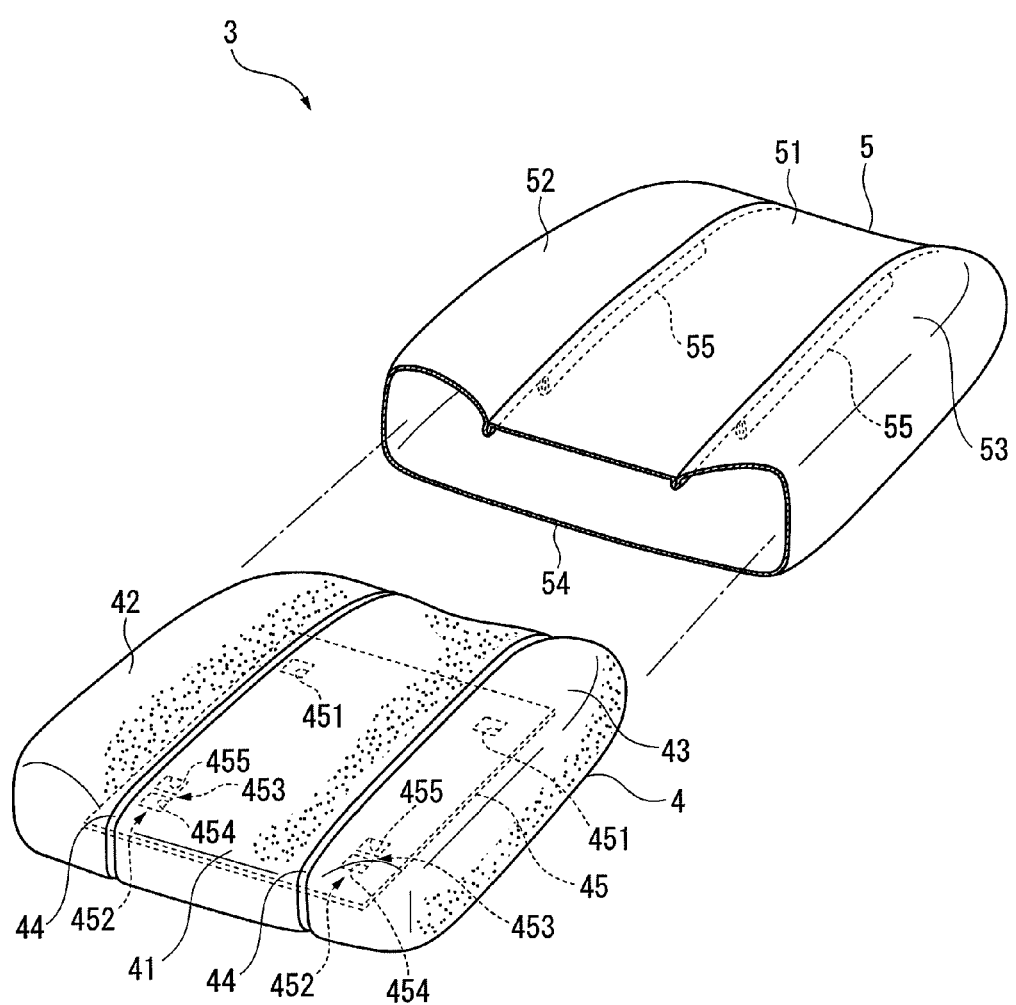
FIG. 2 is a perspective view showing a body and a cover according to the first exemplary embodiment.

FIG. 1 is a perspective view showing a seat 1 according to the first exemplary embodiment. FIG. 2 is a perspective view showing a seat body 4 and a cover 5 of a backrest 3 of the seat 1.

The seat 1 according to the first exemplary embodiment is used for a vehicle such as an automobile. As shown in FIG. 1, the seat 1 includes a seat base 2 and the backrest 3.

As shown in FIG. 2, the backrest 3 includes the seat body 4, a cover 5 covering the seat body 4 and a fixing unit 6 (see FIG. 1) that fixes the cover 5 to the seat body 4.

Arrangement of Seat Body

Though not illustrated, the seat body 4 includes a round-cornered cushion member formed of synthetic resin foam into a substantially rectangular parallelepiped and a frame to which the cushion member is attached. A substantially flat central portion 41 and a left projection 42 and a right projection 43 that are respectively located on the right and left sides of the central portion and are projected relative to the central portion 41 are provided on a front side (i.e. a side facing a back of a user) of the seat body 4. A groove 44 is formed respectively between the central portion 41 and the left projection 42 and between the central portion 41 and the right projection 43. A string member 63 (described later) of the fixing unit 6 is disposed in the groove 44 when the cover 5 is attached to the seat body 4.

As shown in FIGS. 1 and 2, a metal plate body 45 for the fixing unit 6 to be attached is provided at the back of the seat body 4. The plate body 45 is provided with substantially rectangular openings 451 for an attachment member 61 (described later) of the fixing unit 6 to be engaged and openings 452 for an engaging member 62 of the fixing unit 6 to be engaged, each one of the openings 451 and the openings 452 being provided on the right and left sides. In other words, the fixing unit 6 is attached to each of the right and left sides of the plate body 45.

Each of the openings 452 is divided by a dividing portion 453 extending in a horizontal direction (when the seat body 4 is erected upright) into each of a substantially rectangular first opening 454 and second opening 455. The dividing portion 453 extends along the plate body 45 and in a direction orthogonal to a direction in which tension is applied on a string member 63 (described later).

The first openings 454 are located at a lower side when the seat body 4 is erected upright. A first contact portion 622 (described later) of the engaging member 62 is in contact with a lower periphery 454B (i.e. a periphery 454B in the tension-applying direction) of each of the first openings 454. The periphery 454B corresponds to a first periphery of the invention.

The second openings 455 are located above the first opening 454 when the seat body 4 is erected upright. An insert portion 625 (described below) is inserted into each of the second openings 455. A first restricting portion 626 (described later) is in contact with an upper periphery 455T (i.e.

a periphery 455T in a direction opposite the tension-applying direction) of the second opening 455. The periphery 455T corresponds to a second periphery of the invention.

Arrangement of Cover

As shown in FIG. 2, the cover 5 has a shape corresponding to the seat body 4. The cover 5 covers the seat body 4 in a direction opposite the seat base 2.

Specifically, the cover 5 includes at a front side thereof a central portion 51, a left projection 52 and a right projection 53 corresponding to the above-described central portion 41, the left projection 42 and the right projection 43. The cover 5 also includes a backside 54 that covers the plate body 45 provided on the backside of the seat body 4.

Belt portions 55 for the string member 63 (described later) to be inserted are disposed inside the cover 5 at positions corresponding to each of the right and left grooves 44. Each of the belt portion 55 is drawn by the string member 63 toward the seat body 4 when the fixing unit 6 is engaged with the plate body 45. Thus, the cover 5 is fixed while being in close contact with the seat body 4.

It should be understood that the belt portion 55 is not necessarily located at each of the right and left sides. Further, the belt portion 55 may be divided into a plurality of belt portions 55. Further, the size of the belt portion 55 may be defined in any manner.

Arrangement of Fixing Unit

Figure 3:
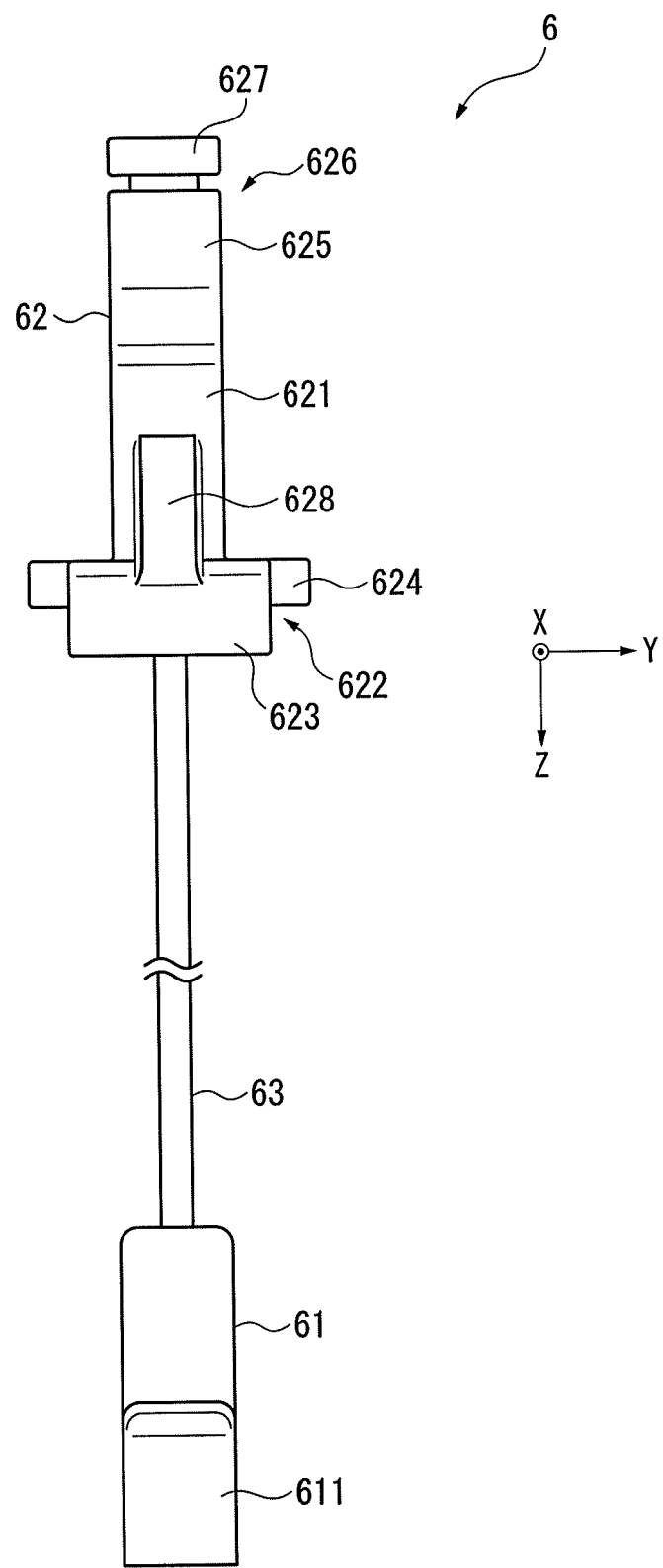
FIG. 3 illustrates a fixing unit according to the first exemplary embodiment.
Figure 4:
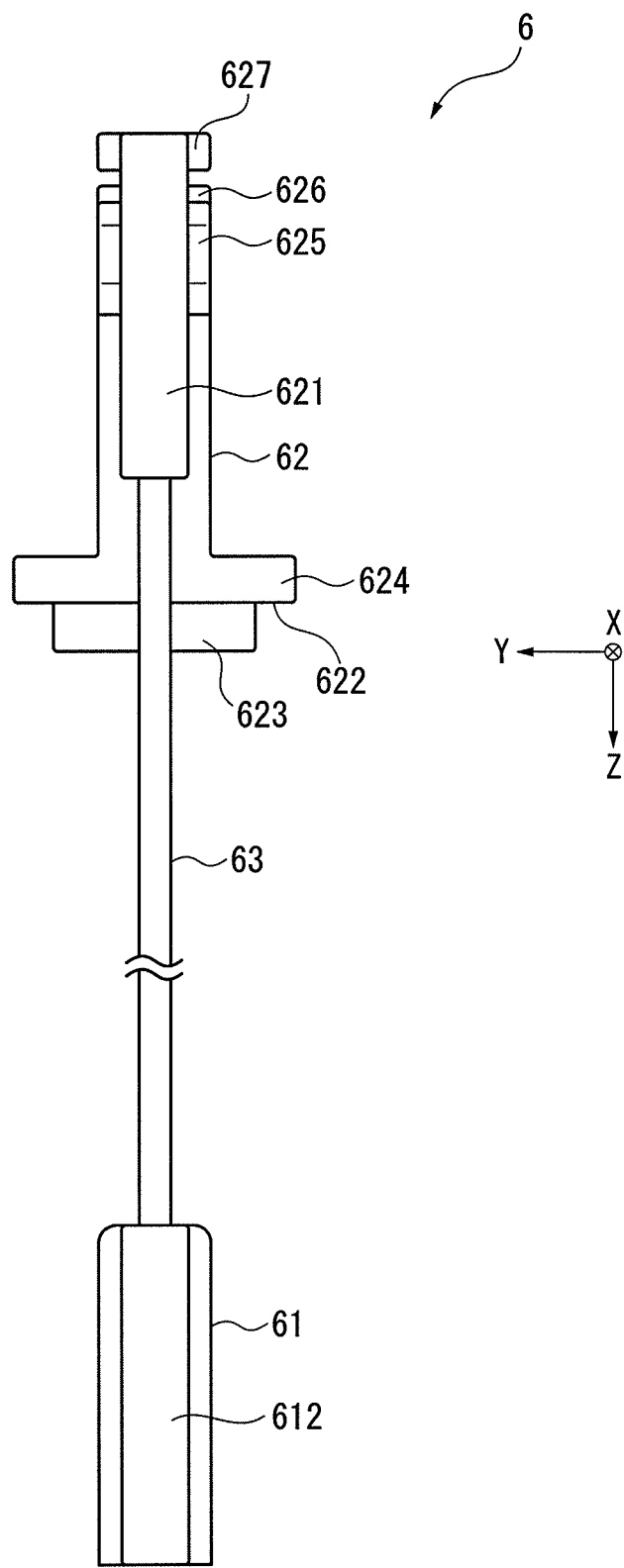
FIG. 4 illustrates the fixing unit according to the first exemplary embodiment.
Figure 5:
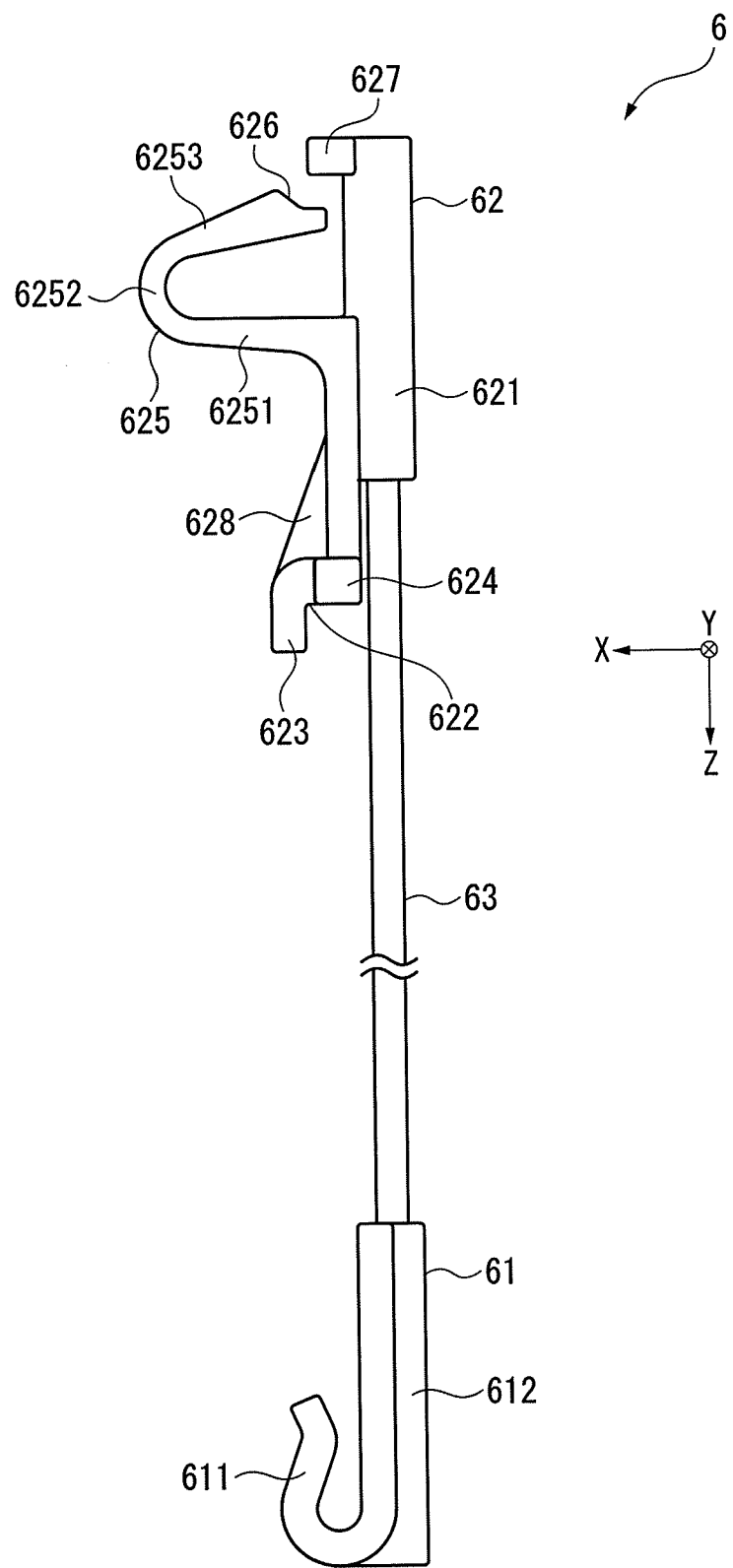
FIG. 5 illustrates the fixing unit according to the first exemplary embodiment.

FIGS. 3 to 5 illustrate the fixing unit 6. Specifically, FIG. 3 shows a side of the fixing unit 6 facing the plate body 45. FIG. 4 shows another side of the fixing unit 6 seen in a direction for the fixing unit 6 to be attached to the plate body 45. FIG. 5 is a side elevation of the fixing unit 6.

As described above, the fixing unit 6 fixes the cover 5 while the cover 5 is in close contact with the seat body 4. As shown in FIGS. 3 to 5, the fixing unit 6 includes the attachment member 61 provided on one end of the fixing unit 6, the engaging member 62 provided on the other end of the fixing unit 6 and the string member 63 connecting the attachment member 61 and the engaging member 62.

Arrangement of Attachment Member and String Member

As shown in FIGS. 3 to 5, the attachment member 61 includes a hook 611 to be hooked to an periphery 451T (see FIG. 6) of the opening 451 and a fixing portion 612 in which the string member 63 is fixed by insert molding.

The string member 63 is made of a synthetic resin such as polyester. The string member 63 passes through the above-described belt portion 55 to be engaged with the cover 5.

Arrangement of Engaging member

The engaging member 62 includes a body 621, a first contact portion 622, a second contact portion 623, a third contact portion 624, an insert portion 625, a first restricting portion 626, a second restricting portion 627 and a bridge portion 628.

The body 621 is provided substantially at the center of the engaging member 62. The string member 63 is attached to the body 621 by insert molding. Incidentally, the extending direction of a central axis of the body 621, i.e. the extending direction of the string member 63, is set in a direction orthogonal to a rotary axis of the engaging member 62 to be rotated around the first contact portion 622.

The first contact portion 622 is provided near an end of the body 621 in a direction for the tension to be applied on the string member 63 (Z direction shown in FIGS. 3 to 5). The first contact portion 622 is to be in contact with the periphery 454B of the first opening 454. Specifically, the first contact portion 622 enters the opening face of the first opening 454 to be in contact with the periphery 454B.

Though detailed below, the first contact portion 622 serves as a fulcrum of a rotary operation for engaging the engaging member 62 to the plate body 45 when the first contact portion 622 is in contact with the periphery 454B.

The second contact portion 623 extends along the tension-applying direction (Z direction) from an end of the first contact portion 622 in an insertion direction (X direction shown in FIGS. 3 to 5) of the insert portion 625 (described below). When the first contact portion 622 is in contact with the periphery 454B, the second contact portion 623 enters an inside of the first opening 454 to guide the first contact portion 622 to be in contact with the periphery 454B.

The second contact portion 623 is in contact with a side of the plate body 45 opposite the insertion direction (X direction) (specifically, a portion of the side near the periphery 454B) when the engaging member 62 is rotated around the first contact portion 622. Thus, the first contact portion 622 is kept from being fallen off from the first opening 454.

The third contact portion 624 extends in a direction (Y direction shown in FIGS. 3 to 5) orthogonal both of the tension-applying direction (Z direction) and the insertion direction (X direction). The third contact portion 624 extends in the same direction as the rotary axis of the engaging member 62 when the engaging member 62 is rotated around the first contact portion 622. The size of the third contact portion 624 in the extending direction thereof is larger than the size of the first opening 454 in the extending direction.

The third contact portion 624 is in contact with an outer part of the first opening 454 of the plate body 45 seen from an insertion direction of the later-described insert portion 625 into the second opening 455 (i.e. an outer part of the first opening 454 of the plate body 45 when facing the opening face of the first opening 454) to guide the first contact portion 622 to be in contact with the periphery 454B (see FIGS. 7 to 9). In addition, the third contact portion 624 is in contact with the outer part to restrict the first contact portion 622 to be sunk into the first opening 454.

Furthermore, the third contact portion 624 holds the plate body 45 together with the second contact portion 623 when the engaging member 62 is engaged with the plate body 45. Thus, the engaging member 62 is restricted from being detached from the plate body 45.

The bridge portion 628 extends from an end of the second contact portion 623 near the insert portion 625 (i.e. an end opposite the Z direction) toward the insert portion 625. The end of the bridge portion 628 near the insert portion 625 is located closer to the insert portion 625 than the portion for the string member 63 to be exposed from the body 621. Further, the bridge portion 628 is inclined to be closer to the body 621 toward the insert portion 625. The bridge portion 628 serves as a rib against the load applied on the first contact portion 622 when the engaging member 62 is engaged with the opening 622.

The insert portion 625 is provided on the body 621 at a position away from the first contact portion 622 by a predetermined distance. Specifically, the insert portion 625 is provided on the body 621 near an end opposite the side at which the first contact portion 622 is located (i.e. near an end opposite the Z direction). The insert portion 625 is inserted into the second opening 455 when the engaging member 62 is engaged with the plate body 45.

The insert portion 625 includes a first extension 6251, a bent portion 6252 and a second extension 6253 and is provided in a substantially U-shape seen in lateral direction (i.e. in a direction aligned with the extending direction of the third contact portion 624). Thus, the insert portion 625 has elasticity (i.e. adapted to expansion and contraction in the tension-applying direction (Z direction)).

The first extension 6251 extends in an insertion direction (X direction) for the insert portion 625 to be inserted into the second opening 455.

The bent portion 6252 is bent from an extension end of the first extension 6251 in a direction opposite the insertion direction (X direction) and the tension-applying direction (Z direction).

The second extension 6253 extends from the bent portion 6252 in a direction opposite the insertion direction (X direction) and is inclined along a direction opposite the tension-applying direction (Z direction).

The dimension obtained by adding the dimension between the ends of the respective extensions 6251 and 6253 opposite the bent portion 6252 (i.e. a dimension in the Z direction) and the thicknesses of the extensions 6251 and 6253 is larger than the dimension of the second opening 455 in the same direction. Thus, when the insert portion 625 is inserted into the second opening 455 after the insert portion 625 is elastically deformed so that the dimension between the respective ends is reduced, the end of the second extension 6253 is in contact with the periphery 455T of the second opening 455 (i.e. the periphery 455T in a direction opposite the Z direction (the tension-applying direction). The first restricting portion 626 is provided at the contact position.

The first restricting portion 626 is in contact with the periphery 455T after the insert portion 625 is inserted into the second opening 455 to restrict the insert portion 625 from being detached from the second opening 455. The first restricting portion 626 is defined in a gentle curve provided by cutting a part of the end of the second extension 6253. Thus, even when there is an error in the dimension of the engaging member 62 and/or the second opening 455, the first restricting portion 626 can be securely in contact with the periphery 455T, thus reliably restricting the detachment of the insert portion 625.

The second restricting portion 627 is provided near an end of the body 621 opposite the first contact portion 622 and at a position corresponding to the periphery 455T. Thus, the second restricting portion 627 is provided at a position facing the first restricting portion 626.

The second restricting portion 627 is in contact with a part of the plate body 45 near the periphery 455T when the insert portion 625 is inserted into the second opening 455, thereby restricting the insert portion 625 from being sunk into the second opening 455.

Cover Fixing Method by Fixing Unit

Figure 6:
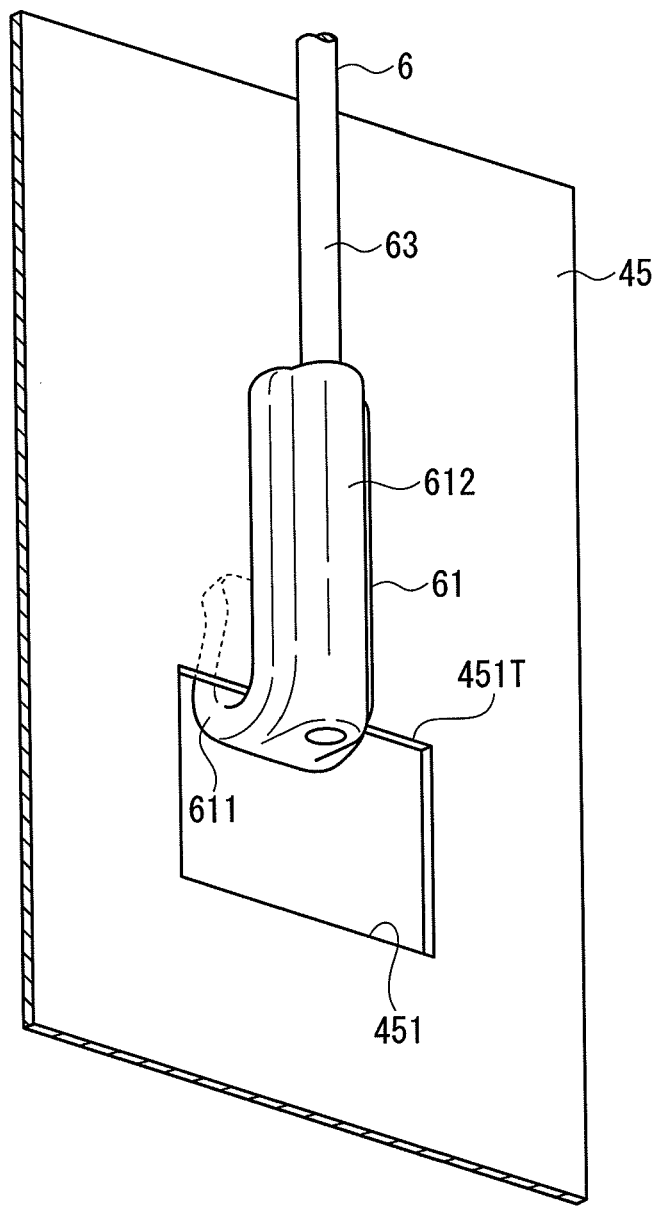
FIG. 6 is a perspective view showing how an attachment member is engaged according to the first exemplary embodiment.

FIG. 6 shows the attachment member 61 engaged with the opening 451. FIGS. 7 to 9 show how to engage the engaging member 62 with the opening 452.

The fixing method of the seat body 4 to the cover 5 using the fixing unit 6 will be described below.

Initially, the attachment member 61 is attached to the plate body 45. Specifically, as shown in FIG. 6, the hook 611 of the attachment member 61 is hooked to the periphery 451T of the opening 451 provided in the plate body 45 of the seat body 4.

Further, the string member 63 of which an end is fixed to the attachment member 61 is engaged with the cover 5 (engaging step). At this time, as shown in FIG. 1, the string member 63 is laid over the front side of the seat body 4 from above and the string member 63 and the engaging member 62 are inserted into the belt portions 55 (see FIG. 2) provided on the cover 5. Subsequently, the cover 5 is disposed so that the seat body 4 is covered and the string member 63 and the belt portion 55 are disposed in the groove 44 (see FIG. 2).

It should be noted that, though the string member 63 and the engaging member 62 are inserted into the belt portion 55 after the attachment member 61 is attached to the plate body 45, the attachment member 61 may be attached to the plate body 45 with the string member 63 being inserted into the belt portion 55 in advance.

Then, the string member 63 is laid over the backside of the seat body 4 from below (in FIG. 1) and the engaging member 62 provided on the other end of the string member 63 is engaged with the plate body 45 (the opening 452) (engaging process).

Figure 7:
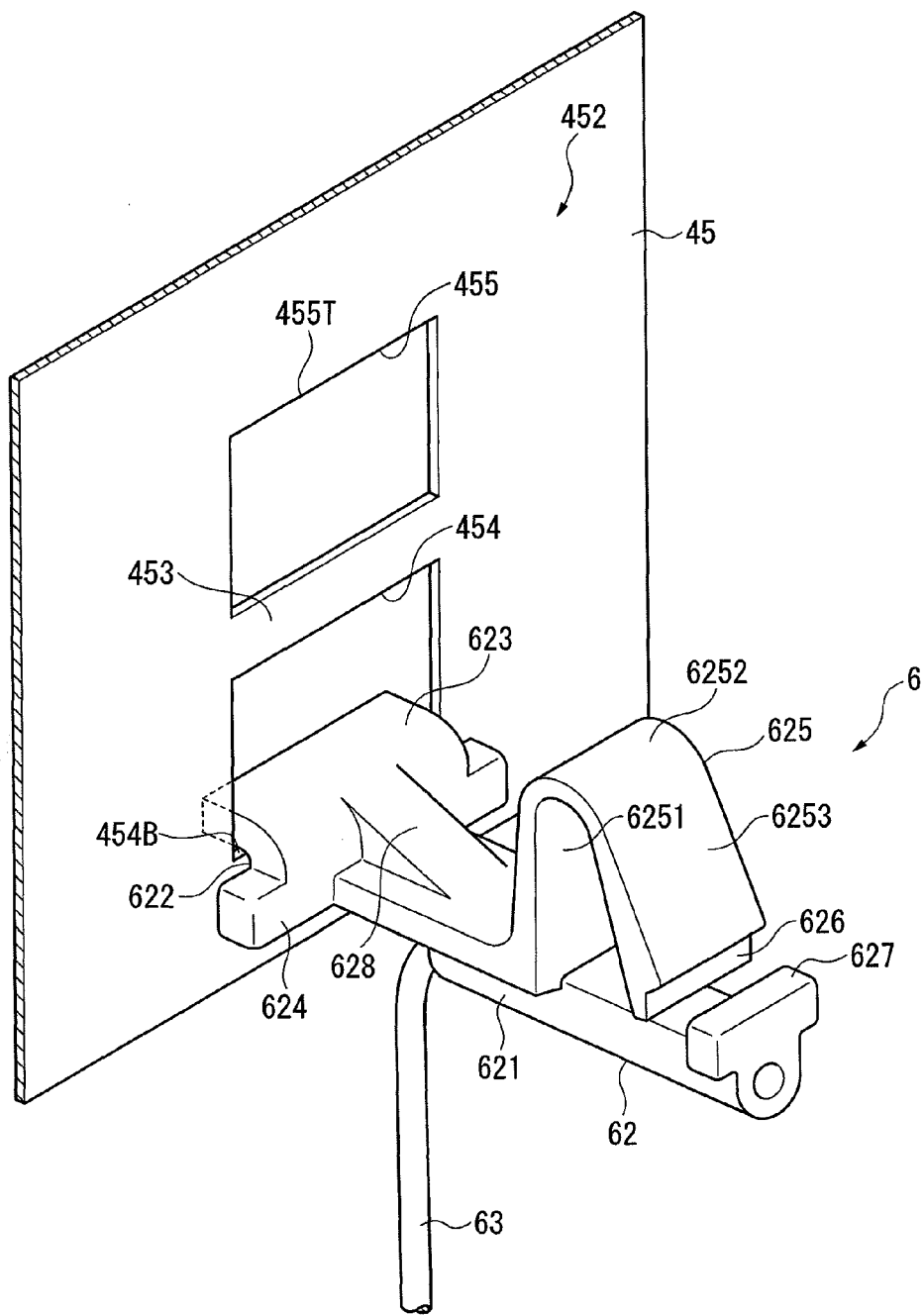
FIG. 7 is a perspective view showing an engagement process of an engaging member according to the first exemplary embodiment.

Specifically, as shown in FIG. 7, the first contact portion 622 is initially brought into contact with the periphery 454B during the engaging process (contact step).

Figure 8:
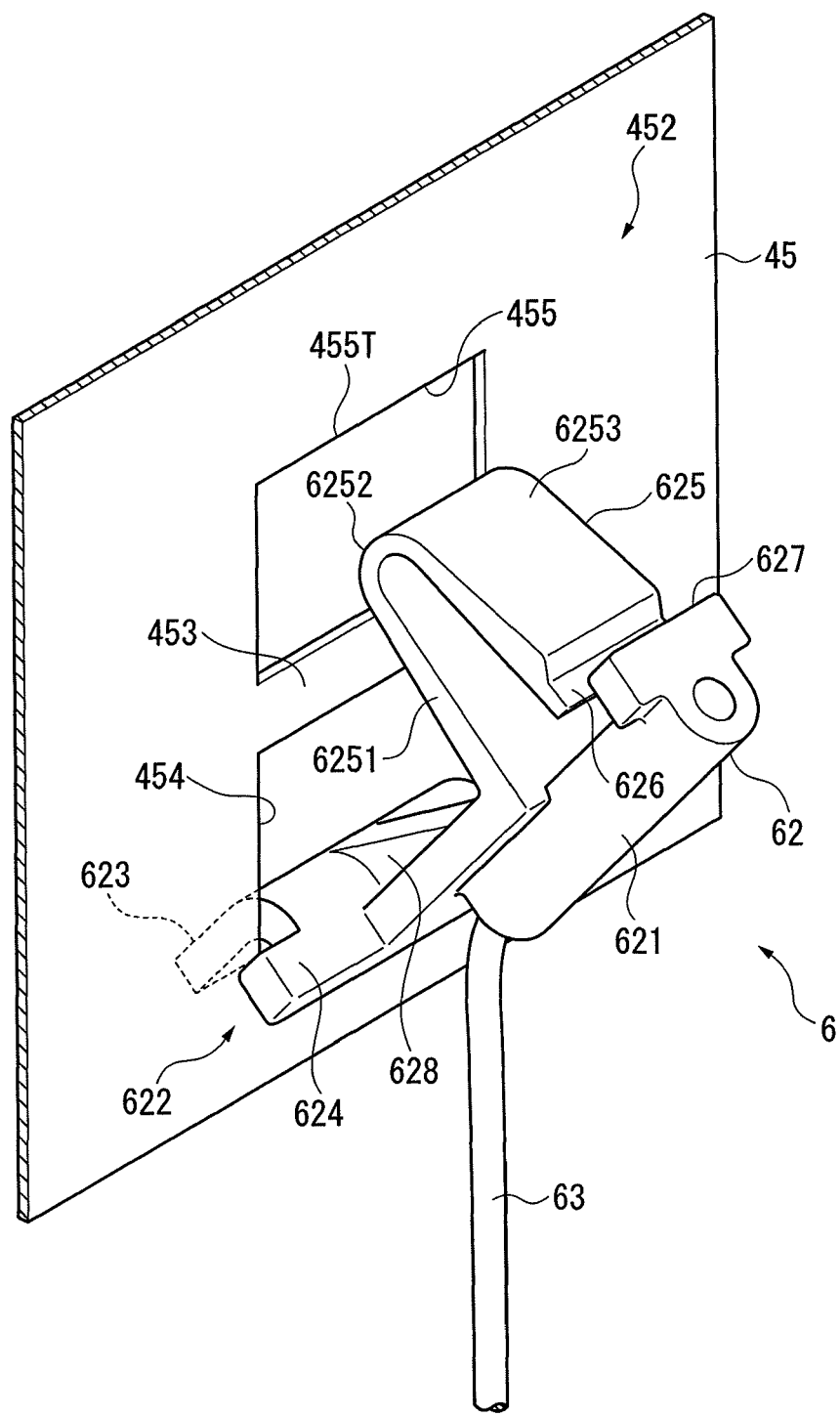
FIG. 8 is another perspective view showing the engagement process of the engaging member according to the first exemplary embodiment.
Figure 9:
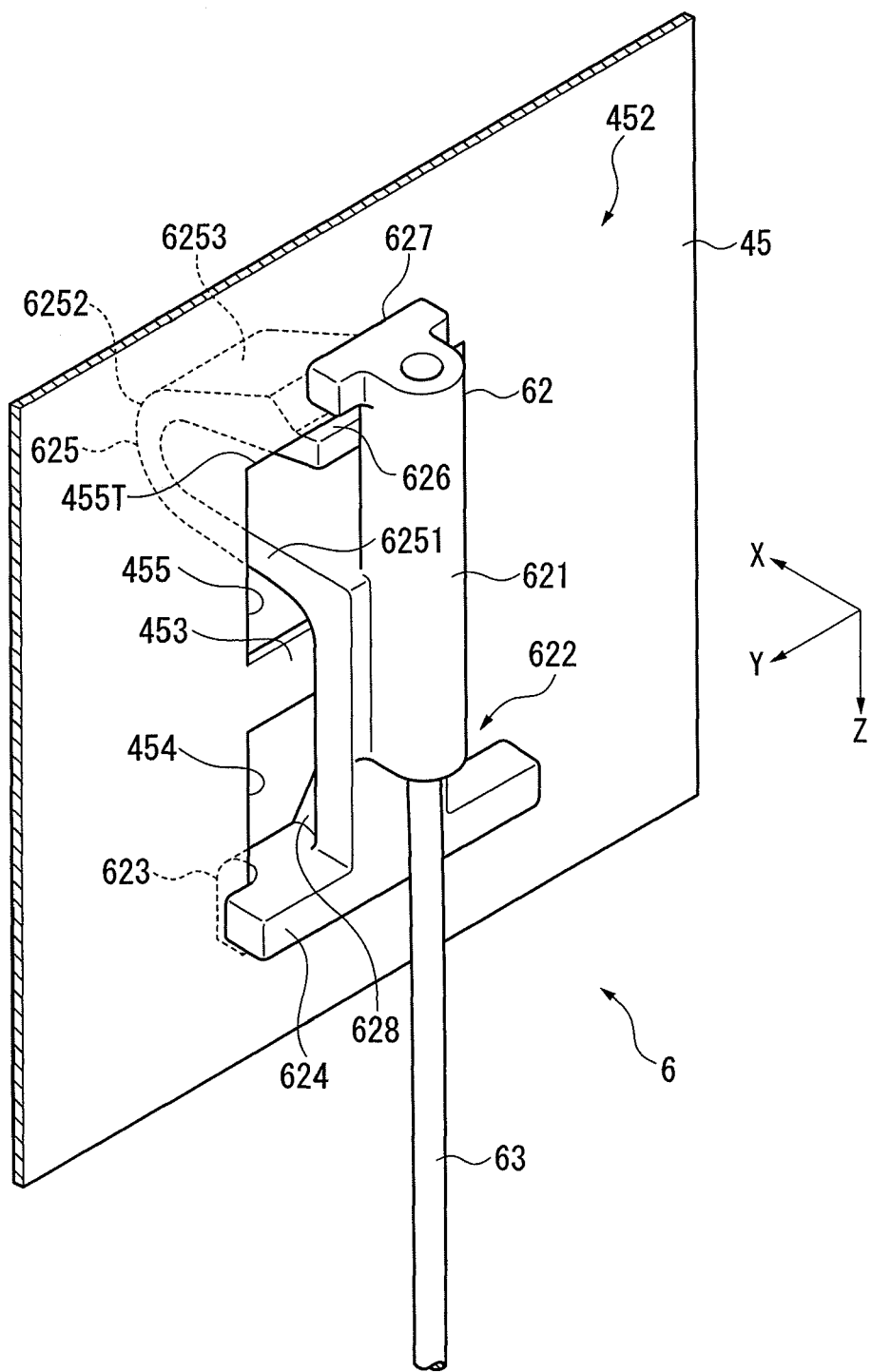
FIG. 9 is still another perspective view showing the engagement process of the engaging member according to the first exemplary embodiment.

Next, as shown in FIG. 8, the first contact portion 622 is rotated (like a lever) around the first contact portion 622 (i.e. fulcrum of leverage) in a direction for an end of the engaging member 62 opposite the first contact portion 622 to come toward the plate body 45 The insert portion 625 is inserted into the second opening 455 as shown in FIG. 9 according to the above rotary operation (insertion step).

At this time, the insert portion 625 is inserted with the second extension 6253 being in contact with the periphery 455T. Thus, the insert portion 625 is elastically deformed so that the ends of the extensions 6251 and 6253 opposite the bent portion 6252 come closer to each other before being inserted into the second opening 455.

Then, when the insert portion 625 is inserted into the second opening 455 so that the second restricting portion 627 is about to be in contact with the plate body 45, the deformed insert portion 625 tends to be returned to the original shape thereof. Thus, the first restricting portion 626 provided by cutting an end of the second extension 6253 is in contact with the periphery 455T. More specifically, the first restricting portion 626 is in contact with the periphery 455T from a side opposite the side at which the body 621 is located Thus, the insert portion 625 is restricted from being detached from the second opening 455 (restriction step).

Under the restriction by the first restricting portion 626, the plate body 45 is held between the second contact portion 623 and the third contact portion 624 at a portion near a periphery of the first opening 454 and is held between the first restricting portion 626 and the second restricting portion 627 at a portion near a periphery of the second opening 455. Thus, since the engaging member 62 is engaged with the plate body 45, the fixing unit 6 is engaged with the seat body 4 and, consequently, the cover 5 engaged with the fixing unit 6 is fixed to the seat body 4.

According to the seat 1 of the above-described first exemplary embodiment, the following advantages can be obtained.

The engaging member 62 is rotated around the first contact portion 622 that is in contact with the periphery 454B and the insert portion 625 spaced away from the first contact portion 622 is inserted into the second opening 455 to engage the engaging member 62 with the plate body 45. Thus, the fixing unit 6 can be easily engaged with the seat body 4 and the cover 5 can be easily fixed to the seat body 4.

Further, when the length of the string member 63 is adjusted so that appropriate tension is applied to the string member 63 while the insert portion 625 is inserted into the second opening 455, it is not necessary to pull up the engaging member 62 more than necessary. Accordingly, the force required for engaging the engaging member 62 to the plate body 45 can be reduced.

In addition, the insert portion 625 is inserted into the second opening 455 by the rotation of the engaging member 62 around the first contact portion 622, so that the engaging member 62 is engaged with the plate body 45. At this time, the engaging member 62 is kept from moving in the above-described tension-applying direction (Z direction) relative to the plate body 45. Thus, the stress applied on the attachment member 61 and the engaging member 62 can be appropriately adjusted and maintained via the string member 63. Accordingly, the fixing unit 6 can be stably fixed to the plate body 45 and, consequently, to the seat body 4, and the cover 5 can be appropriately fixed to the seat body 4.

Since the insert portion 625 is elastically deformed before being inserted into the second opening 455, the insert portion can be easily inserted. In addition, by deforming the insert portion 625 so that the insert portion 625 is compressed, the engaging member 62 can be detached from the plate body 45.

In addition, since the first restricting portion 626 is located at the insert portion 625 (the second extension 6253) in contact with the periphery 455T, substantially simultaneously with the completion of the insertion operation of the insert portion 625 into the second opening 455, the insert portion 625 can be restricted from being detached from the second opening 455.

The insert portion 625 is provided in a substantially U-shape having the first extension 6251, the bent portion 6252 and the second extension 6253. According to the above arrangement, by initially inserting the bent portion 6252 into the second opening 455, the insert portion 625 is more easily elastically deformed when the insert portion 625 passes through the second opening 455. Thus, the insert portion 625 can be more easily inserted and, consequently, the engaging member 62 can be more easily engaged with the seat body 4.

After the insert portion 625 is inserted into the second opening 455, the respective ends of the extensions 6251 and 6253 opposite the bent portion 6252 tend to extend in a direction mutually separating from each other. Thus, the first restricting portion 626 provided on an end of the second extension 6253 is likely to be in contact with the periphery 455T. Accordingly, the detachment of the insert portion 625 can be securely prevented by the first restricting portion 626.

The second restricting portion is in contact with the plate body 45 when the insert portion 625 is inserted into the second opening 455, thereby restricting the insert portion 625 from being sunk into the second opening 455. Thus, the engaging member 62 can be more easily engaged and the engaging member 62 can be securely engaged with the seat body.

Since the second contact portion 623 extending from the first contact portion 622 is hooked to the periphery 454B, the first contact portion 622 can be more easily brought into contact with the periphery 454B. Accordingly, the rotary operation of the engaging member 62 can be easily conducted.

In addition, when the insert portion 625 is inserted into the second opening 455, the second contact portion 623 is in contact with a side of the plate body 45 opposite to the side at which the body 621 is located. Thus, since the detachment of the first contact portion 622 from the first opening 454 is restricted, the detachment of the engaging member 62 from the plate body 45 can be securely prevented in combination with the first restricting portion 626. Accordingly, the engaging member 62 can be easily engaged with the seat body 4 and the cover 5 can be securely fixed to the seat body 4.

Since the third contact portion 624 is in contact with an outer part of the first opening 454, the first contact portion 622 can be guided to the periphery 454B. In addition, the first contact portion 622 can be kept from being sunk into the first opening 454.

Furthermore, when the engaging member 62 is engaged with the plate body 45, the second contact portion 623 and the third contact portion 624 hold the plate body 45 near the periphery 454B. Accordingly, the engaging member 62 can be stably engaged with the seat body 4.

The first opening 454 and the second opening 455 divided by the dividing portion 453 are provided in the plate body 45. In addition, the first contact portion 622 as the rotation fulcrum is in contact with the periphery 454B of the first opening 454 and the insert portion 625 is inserted into the second opening 455 to engage the engaging member 62 to the plate body 45. According to the above arrangement, the dividing portion 453 keeps the body 621 provided thereon with the first contact portion 622 and the insert portion 625 from being sunk into the openings 454 and 455. Thus, the engaging member 62 can be appropriately engaged with the seat body 4.

Second Exemplary Embodiment

Next, a seat according to a second exemplary embodiment of the invention will be described below.

The seat according to the second exemplary embodiment is arranged in the same manner as the seat 1 except that the arrangement of the engaging member of the fixing unit used for the seat is different from the arrangement of the engaging member 62 of the fixing unit 6 used for the seat 1.

It should be noted that the same or substantially the same component as those described thus far are denoted with the same reference numerals and explanation thereof is omitted in the following description.

Figure 10:
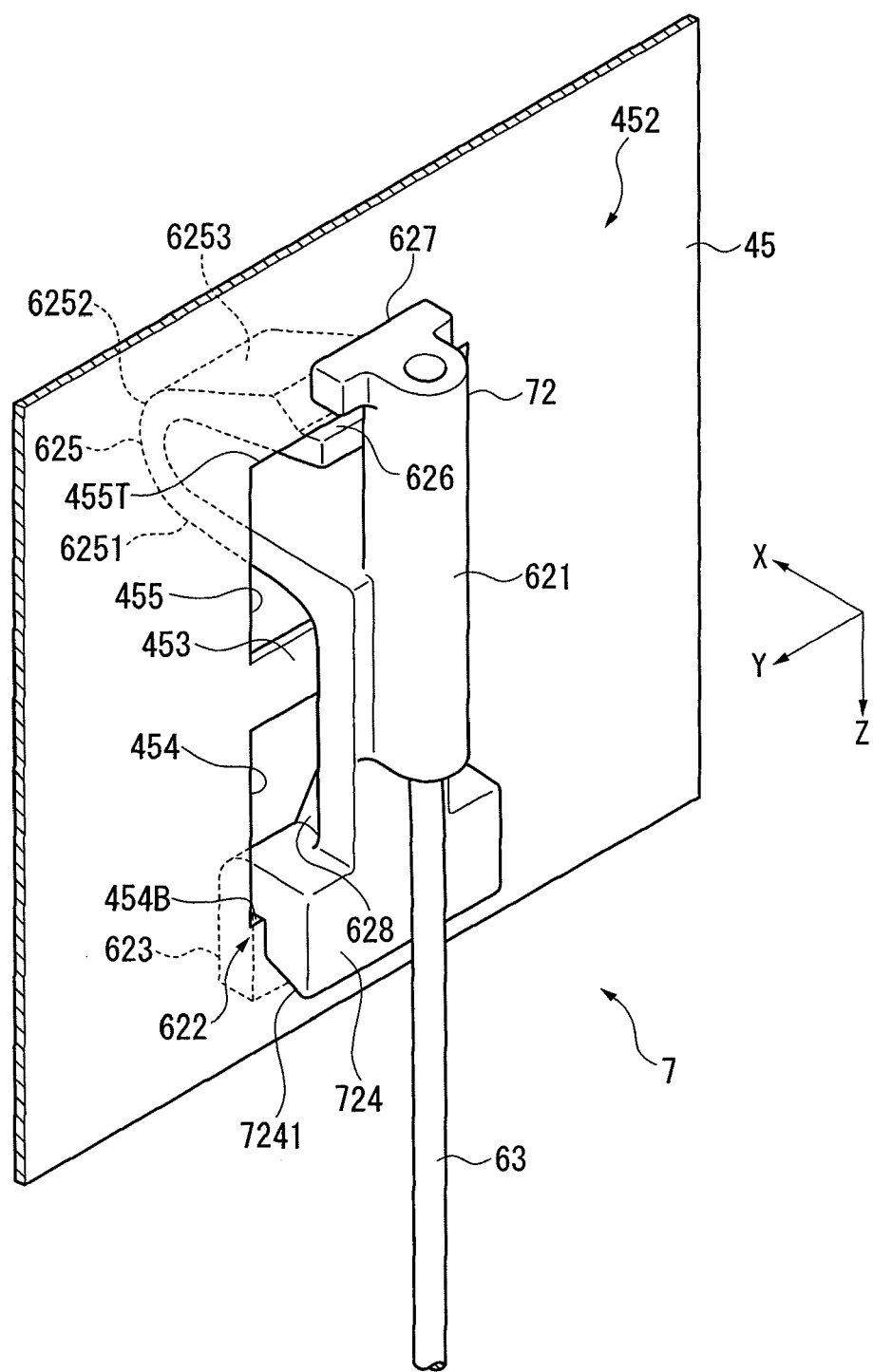
FIG. 10 is a perspective view showing how an engaging member of a fixing unit of a seat according to a second exemplary embodiment of the invention is engaged.

FIG. 10 is a perspective view showing how an engaging member of a fixing unit of the seat according to the second exemplary embodiment is engaged.

The seat according to the second exemplary embodiment is arranged in the same manner as the seat 1 except that a fixing unit 7 is provided instead of the fixing unit 6. The fixing unit 7 according to the second exemplary embodiment is arranged in the same manner as the fixing unit 6 except that an engaging member 72 is provided instead of the engaging member 62.

As shown in FIG. 10, the engaging member 72 is arranged in the same manner as the engaging member 62 except that a fourth contact portion 724 is provided instead of the third contact portion 624.

The fourth contact portion 724 extends from an end of the first contact portion 622 opposite the side at which the second contact portion 623 is located and along the above-described tension-applying direction (Z direction) to face the second contact portion 623. Specifically, the fourth contact portion 724 extends from an end of the first contact portion 622 opposite the second contact portion 623 in a direction from the insert portion 625 to the first contact portion 622. Then, the fourth contact portion 724 is in contact with a part of the plate body 45 near the periphery 454B to restrict the first contact portion 622 from being sunk into the first opening 454 when the engaging member 72 is engaged with the plate body 45. In other words, the fourth contact portion 724 is in contact with an outer part of the first opening 454 seen from an insertion direction of the insert portion 625 into the second opening 455 (i.e. an outer part of the first opening 454 of the plate body 45 when facing the opening face of the first opening 454). In addition, the fourth contact portion 724 holds the plate body 45 together with the second contact portion 623, thus restricting the detachment and sinking of the engaging member 72.

The fourth contact portion 724 has an inclined portion 7241 that extends in the tension-applying direction (Z direction) toward a direction opposite the insertion direction (X direction). The inclined portion 7241 keeps the third contact portion 724 from hindering the rotary operation of the engaging member 72 due to the contact between the third contact portion 724 and the plate body 45 when the engaging member 72 is rotated.

According to the seat of the above-described second exemplary embodiment, the same advantages as the above-described sheet can be obtained. Further, since the fourth contact portion 724 extends from the first contact portion 622 in the tension-applying direction (Z direction), the dimension of the fixing unit 7 in the Y direction can be reduced as compared with the fixing unit 6 having the third contact portion 624.

Modifications

Though some of the best arrangements for implementing the invention are disclosed in the above, the scope of the invention is not limited to the above exemplary embodiment. Specifically, any descriptions of shape or material or the like disclosed above are given as examples to enable easy understanding of the invention and do not limit the present invention, so that descriptions using names of components, with any such limitations of shape or material or the like removed in part or whole, are included in the scope of the invention.

Though the opening 452 of the plate body 45 to which the engaging members 62 and 72 are engaged is divided by the dividing portion 453 into the first opening 454 and the second opening 455 in the above-described exemplary embodiments, the invention may be arranged otherwise. Specifically, the engaging member may be engaged with a single opening. In this arrangement, the engaging member may be attached so that the first contact portion is in contact with a periphery of the opening in the tension-applying direction and the first restricting portion is in contact with a periphery opposite the tension-applying direction.

Further, it is not necessary that the engaging members 62 and 72 are engaged with the plate body 45 (opening 452) provided to the seat body 4. In other words, the plate body is not necessary as long as the engaging member can be engaged.

Though the engaging members 62 and 72 are provided with the second contact portion 623 and the third contact portions 624, 724, the invention may be arranged otherwise. Specifically, only one of the second contact portion and the third contact portion may be provided or, as long as the engaging member can be appropriately engaged, the second contact portion and the third contact portion is not necessary.

The insert portion 625 is provided in a substantially U-shape (in a side elevation) having the first extension 6251, the bent portion 6252 and the second extension 6253 in the above-described exemplary embodiments, the invention may be arranged otherwise. Specifically, the insert portion 625 may be formed in the other shape such as an arrowhead shape. Further, as long as the insert portion is adapted to be inserted into the opening by elastic deformation and expanded after being inserted to restrict the detachment from the opening, the insert portion may be provided by an elastic body. Further, as long as the insert portion can be appropriately engaged with the seat body, it is not necessary that the insert portion is provided with the above arrangement and properties.

Though the second restricting portion 627 is disposed at a position facing the first restricting portion 626 and is brought into contact with a part near the periphery 455T of the plate body 45 in the respective exemplary embodiments, the invention may be arranged otherwise. In other words, as long as the second restricting portion is capable of being in contact with the seat body to restrict the insert portion from being sunk into the opening, the second restricting portion may be in contact with any position. For instance, the second restricting portion may extend in the same direction as that of the third contact portion 624.

Though the attachment member 61 is attached to the opening 451 of the plate body 45 attached to the backside of the seat body 4, the invention may be arranged otherwise. Specifically, the attachment member 61 may be attached to the other part as long as the attachment member 61 can be attached. For instance, the attachment member 61 is not necessarily attached to the plate body 45 but may be attached to a frame of the seat body 4 or may be attached to a member (e.g. wire) provided to a cushion member of the seat body 4.

Though the attachment member 61 is provided with the hook 611 engaged with the periphery 451T of the opening 451 in the above exemplary embodiments, the invention may be arranged otherwise. In other words, the attachment member 61 may be configured in any manner as long as the attachment member 61 can be attached to the seat body 4. For instance, the engaging member 62 may be provided instead of the attachment member 61. In other words, the engaging member may be provided on both ends of the fixing unit.

Though the seat 1 according to the above exemplary embodiments is used for a vehicle such as an automobile, the invention may be arranged otherwise. Specifically, the invention is applicable to a household seat or seat for business.

The invention claimed is:

1. A fixing unit that is used for a seat comprising a seat body and a cover that covers the seat body, the fixing unit being used for fixing the cover to the seat body, the fixing unit comprising:
    an attachment member attached to the seat body;
    an engaging member engaged with an opening provided to the seat body; and
    a string member that connects the attachment member and the engaging member and is engaged with the cover, wherein
    the engaging member comprises:
    a body to which the string member is attached;
    a first contact portion provided to the body to be in contact with a first periphery of the opening; and
    an insert portion provided to the body being spaced apart from the first contact portion and provided with a first restricting portion,
    wherein, the insert portion has elasticity, and
    the insert portion is elastically deformed when inserted into the opening and once inserted, the first restricting portion is in contact with a second periphery of the opening opposite the first periphery and the first restricting portion retains the insert portion in the opening.

2. The fixing unit according to claim 1, wherein
    the insert portion comprises:
    a first extension extending in a direction perpendicular to a central axis of the body;
    a bent portion that is bent from an end of the first extension away from the first contact portion; and
    a second extension extending from the bent portion towards the body, and
    the first restricting portion is provided at an end of the second extension.

3. The fixing unit according to claim 1, further comprising:
    a second restricting portion located at a position corresponding to the second periphery, the second restricting portion being in contact with the seat body to restrict the insert portion from being sunk into the opening once the insert portion is inserted into the opening.

4. The fixing unit according to claim 1, wherein
the seat body comprises a plate body provided thereon with the opening, and
the fixing unit comprises a second contact portion extending from the first contact portion in a direction from the insert portion to the first contact portion, the second contact portion in contact with a side of the plate body opposite a side of the plate body at which the body is located once the insert portion is inserted into the opening.

5. The fixing unit according to claim 1, further comprising:
a third contact portion extending from the first contact portion in a direction orthogonal to both a central axis of the body and a direction perpendicular to a plane of the opening, the third contact portion being in contact with a part of the seat body outside the opening.

6. The fixing unit according to claim 1, wherein the seat body comprises a plate body provided thereon with the opening, further comprising:
a fourth contact portion extending from the first contact portion in a direction from the insert portion to the first contact portion, the fourth contact portion being in contact with a part of the plate body outside the opening.

7. A seat, comprising:
a seat body;
a cover covering the seat body; and
the fixing unit according to claim 1,
wherein the seat body comprises the opening in which the engaging member is engaged, and
the opening is divided by a dividing portion into:
a first opening including the first periphery; and
a second opening including the second periphery.

8. A cover fixing method that is used for a seat comprising a seat body and a cover that covers the seat body, the cover fixing method being used for fixing the cover to the seat body, the method comprising:
an attaching step for attaching an attachment member of a fixing unit to the seat body and engaging the cover with a string member connected to the attachment member; and
an engaging step for engaging an engaging member to an opening provided to the seat body, the engaging member being provided on a side opposite the attachment member with the string member being interposed therebetween, wherein
in the engaging step a contact portion provided on the engaging member is brought into contact with a first periphery of the opening,
the engaging member is rotated around the contact portion to insert an insert portion into the opening, and
a part of the insert portion is brought into contact with a second periphery of the opening opposite the first periphery to retain the insert portion in the opening.

9. A fixing unit that is configured to fix a cover to a seat, the fixing unit comprising:
an attachment member having a hook;
a string member that connects the attachment member and an engaging member;
the engaging member comprising:
a body to which the string member is attached;
an insert portion provided to the body, wherein the insert portion comprises:
a first extension extending in a direction perpendicular to a central axis of the body;
a bent portion that is bent from an end of the first extension away from an end of the body attached to the string member;
a second extension extending from the bent portion towards the body; and
a first restricting portion provided at an end of the second extension; and
a first contact portion, a second contact portion, and a third contact portion, wherein the first contact portion, the second contact portion, and the third contact portion are provided to the body and are spaced apart from the insert portion.

10. The fixing unit according to claim 9, further comprising:
a second restricting portion located near an end of the body that is opposite the first contact portion.

11. The fixing unit according to claim 9, wherein the second contact portion extends from the first contact portion in a direction from the insert portion to the first contact portion.

12. The fixing unit according to claim 11, further comprising:
a bridge portion that extends from an end of the second contact portion near the insert portion toward the insert portion.

13. The fixing unit according to claim 9, wherein the third contact portion extends from the first contact portion in a direction orthogonal to both the central axis of the body and the first extension.

* * * * *

UNITED STATES PATENT AND TRADEMARK OFFICE
CERTIFICATE OF CORRECTION

| | | |
|---|---|---|
| PATENT NO. | : 9,004,591 B2 | |
| APPLICATION NO. | : 13/812209 | |
| DATED | : April 14, 2015 | |
| INVENTOR(S) | : Ryuichi Murasaki et al. | |

It is certified that error appears in the above-identified patent and that said Letters Patent is hereby corrected as shown below:

On the title page, item (54) and in the specification, in column 1, line 1, in "Title", delete "FIXTURE" and insert -- FIXING --, therefor.

Signed and Sealed this
Twenty-fourth Day of November, 2015

Michelle K. Lee
*Director of the United States Patent and Trademark Office*